United States Patent [19]
Piotrowski et al.

[11] Patent Number: 5,671,649
[45] Date of Patent: Sep. 30, 1997

[54] METHOD OF MAKING PROTECTIVE SLEEVE WITH WARP SPACERS

[75] Inventors: Michael J. Piotrowski, Norristown; Robert Brushafer, West Chester; Janice R. Maiden, Oreland; Joan Bitwinski, Philadelphia, all of Pa.

[73] Assignee: Bentley-Harris Inc., Exton, Pa.

[21] Appl. No.: 623,932

[22] Filed: Mar. 28, 1996

Related U.S. Application Data

[62] Division of Ser. No. 388,032, Feb. 14, 1995, Pat. No. 5,538,045.

[51] Int. Cl.⁶ ................................................. D04C 1/00
[52] U.S. Cl. .................... 87/9; 87/5; 87/6; 87/7; 87/13
[58] Field of Search .......................... 138/149, 123, 138/124, 125, 126, 127; 87/5, 6, 7, 8, 9, 13

[56] References Cited

U.S. PATENT DOCUMENTS

| | | | |
|---|---|---|---|
| 2,114,274 | 4/1938 | Huppert | 96/26 |
| 2,352,391 | 6/1944 | Kitselman | 74/501 |
| 4,754,685 | 7/1988 | Kite et al. | 87/9 |
| 4,777,859 | 10/1988 | Plummer, Jr. | 87/7 |
| 4,836,080 | 6/1989 | Kite, III et al. | 87/9 |
| 4,946,722 | 8/1990 | Moyer | 428/36.1 |
| 5,197,370 | 3/1993 | Gladfelter | 87/7 |
| 5,343,895 | 9/1994 | King et al. | 138/149 |
| 5,413,149 | 5/1995 | Ford et al. | 138/123 |

FOREIGN PATENT DOCUMENTS

| | | | |
|---|---|---|---|
| 543431 | 12/1955 | Belgium | 87/9 |

OTHER PUBLICATIONS

"Automotive Products" by Bentley-Harris, 4 pages (1986).

*Primary Examiner*—William Stryjewski
*Attorney, Agent, or Firm*—Synnestvedt & Lechner

[57] ABSTRACT

A braided product and process include a first sleeve formed of interbraided first and second yarns which may be continuous E glass yarns. Warp beads formed by knitting or braiding are equidistantly spaced around the circumference of the braid and introduced to the braider to form an integral part of the structure. One or more heavy denier yarns are loaded on carriers so as to cross the warp beads under relatively high tension, forcing the beads selectively to the inside or outside of the sleeve surface so as to create longitudinally extending spacers which create air gaps between the sleeve and the surface of the substrate being covered.

4 Claims, 2 Drawing Sheets

CARRIER CIRCULAR BRAIDER

५,६७१,६४९

METHOD OF MAKING PROTECTIVE SLEEVE WITH WARP SPACERS

This is a divisional of application Ser. No. 08/388,032 filed on Feb. 14, 1995, now U.S. Pat. No. 5,538,045.

FIELD OF THE INVENTION

This invention relates to textile sleeving products and, more particularly, to textile sleeving products including means formed integrally of the products for providing clearance space between a sleeve and a surface the sleeve is intended to cover. A particular application of the invention is the provision of textile sleeving products in which an insulating air gap is formed between the sleeve and a tubular heat source.

BACKGROUND OF THE INVENTION

Various efforts in the past have been made to provide relatively low cost, lightweight insulating sleeves knitted, woven or braided of glass fiber or other insulating yarns for the purpose of insulating elongated tubes and similar elements. A need arises in the automotive field in the insulation of very high temperature devices, such as exhaust gas recirculation devices. The high temperatures generated by such devices are potentially damaging to other automotive components and, if the devices are not isolated, have been known to ignite combustibles if, for example, the automobile is parked in a field of dry grass.

Although sleevings of the type sold by The Bentley-Harris Manufacturing Company under the trademarks THERMFLEX and THERMFLEX SPIRAL are effective for many applications, there are occasions where an unsatisfied need still persists for a cost effective solution to the need for the protection of components from the deleterious effects of heat generated in modern high-performance vehicles.

The THERMFLEX SPIRAL product referenced above is a flexible, smooth, compactly braided sleeve which is braided from glass fiber yarns. In the THERMFLEX SPIRAL product, a spiral cord of relatively large diameter stands the insulating sleeve off from the substrate, creating an air gap in order to increase its insulation properties. Although this product solved the problem to a degree, the air gap provided is not as great as is desired for many applications.

SUMMARY AND OBJECTS OF THE INVENTION

According to the invention, an insulating sleeve product is provided which is comprised of interbraided first and second thermally insulating yarns and a plurality of warp beads or cords of relatively large diameter extending lengthwise of the product. The warp beads are disposed equidistantly about the sleeve's circumference and are integral with the sleeve by being interlocked between the first and second yarns. The invention provides one or more high tensile modulus third yarns which extend spirally of the sleeve. The third yarns are placed on selected carriers on the braider and are interbraided under tension on the braider in a manner in which they press against all of the warp yarns forcing all the warp yarns either radially inwardly or radially outwardly of the sleeve wall surface. By use of the relatively highly tensioned helically extending third yarns, the warp yarns may be made to selectively project either inwardly or outwardly of the sleeve wall by a greater distance than is otherwise feasible, thereby providing a substantially increased air gap between the sleeve side wall and the surface being covered in a highly effective manner. The surface being covered may be that of a heat source, such as an exhaust gas recirculation device, in which case components in its vicinity can be protected from effects of high temperature or it may be the surface of a tubular device requiring protection from high temperatures. In cases where an air gap is desired around the outer circumference of the sleeve, the braider is set up so that the tensioned helical yarn passes to the inside of all warp beads, forcing these beads to project radially outwardly from the sleeve surface.

Preferably, the sleeving product manufactured as described is further provided with a second, outer sleeve which is either over braided over the first sleeve or placed over it at a later time. The yarns of the second sleeve will preferably be formed of the same yarns as the first and second yarns in the first sleeve in order to further enhance the insulating capabilities.

It has been determined that a sleeving product made according to the invention and comprising an inner and outer sleeve as described above utilizing glass fiber yarns and placed over a heated tube will successfully withstand temperatures of at least 1650° F. and has the capability of maintaining its surface temperature at about 250° F. In many applications, glass fiber yarns can be used where more expensive ceramic yarns would otherwise have been required. This is deemed to be on account of the air gap. It has been observed that without the tensioned helically extending third yarn, the warp beads tend to move to a position in which they center on the centerline of the sleeve; whereas with the third yarns, the warp beads remain substantially offset from the sleeve centerline.

Such sleeving products are lightweight, can be manufactured on high speed circular braiders without constant attention by workers, are relatively inexpensive to produce and exhibit better performance characteristics than comparable prior art products. The invention is directed both to a novel sleeving product and to the process of making the product.

DETAILED DESCRIPTION OF THE PREFERRED EMBODIMENT OF THE PRESENT INVENTION

Figure 1:
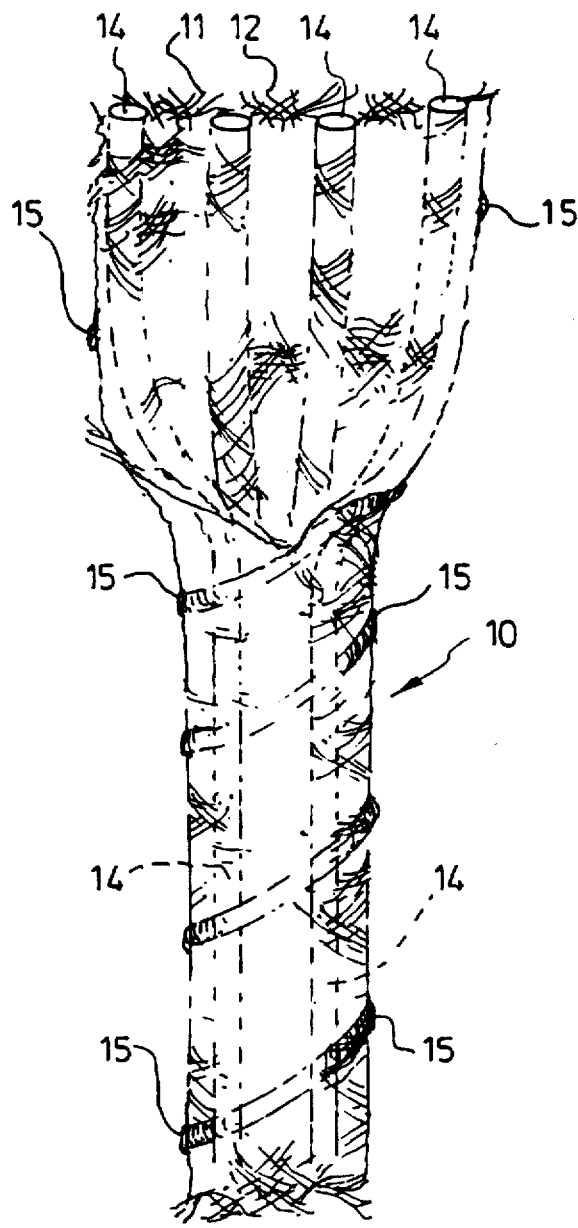
FIG. 1 is a side view of a preferred embodiment of a first sleeve having a portion cut away to show the internal structure, the sleeve being formed in accordance with the teachings of the invention.
Figure 2:
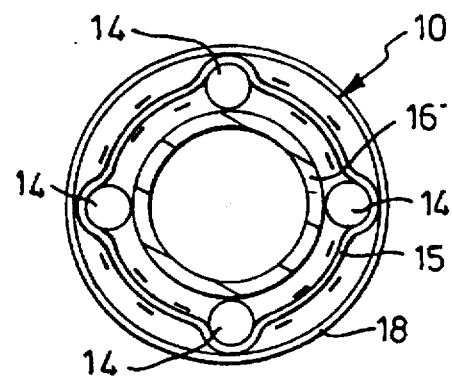
FIG. 2 is a schematic, right sectional view illustrating a sleeve product of the type shown in FIG. 1, the product covering an elongated tubular object.
Figure 3:
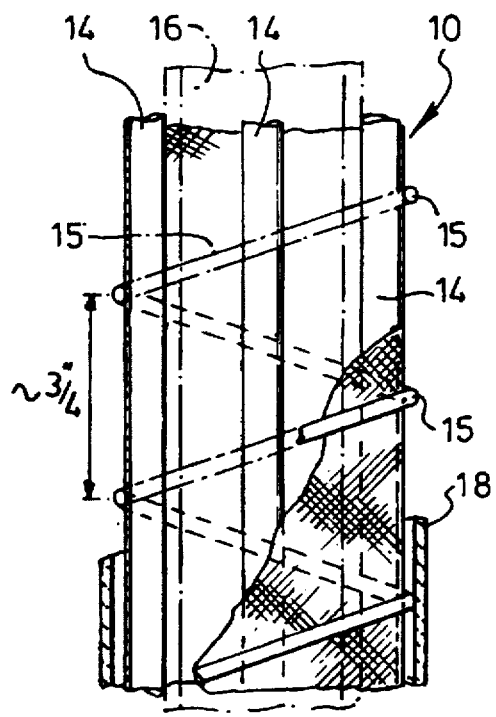
FIG. 3 is an elongated sectional view in schematic form of the sleeve of FIG. 1.

With reference first to FIG. 1, wherein the presently preferred embodiment of the invention is shown, the sleeving product preferably comprises a first braided sleeve 10 braided from first and second yarns 11 and 12 of a thermally insulating material. Each such yarn was comprised of three ends of continuous filament E glass 37 1/3 of 3608 denier per end. Four longitudinally extending warp beads or cords 14 having a yield of 0.0451 feet per pound are provided in carriers located on the braider so that the beads are equidistantly spaced around the circumference of the sleeve. As the sleeve is braided, the warp beads are interlocked in place by the first and second yarns. The warp beads 14 may be knitted or braided in a manner well known in the cord or rope forming art and are relatively dense (non-compressible) and of relatively large diameter. The warp beads in the illustrative embodiment were knitted. Although the number of warp beads may vary somewhat, four will be sufficient for most purposes and is considered to be optimum for an exhaust gas recirculation tube having an outside diameter which is typically on the order to about ⅝".

In the illustrative embodiment, beads or cords 14 (sometimes referred to herein as ropes) are braided of texturized glass yarn. The cords employed in the illustrative embodiment have a diameter of about 3/16", although larger or smaller cords could be employed depending upon the amount of air space to be established between the sleeve and the surface to be covered.

According to the invention, third yarns which comprise one or more helically extending high tensile third yarns 15 are provided on selected carriers of the circular braider. These yarns are interbraided with the first and second yarns and extend helically of the product. The helically extending third yarns 15 may be of the same construction as the longitudinally extending warp beads or may be other heat resistant yarn such as a texturized glass fiber yarn. One such suitable yarn is 2.7 Texo having a denier of 16480. Although the helically extending third yarns could extend helically in crossing paths, it has been found that the use of one or more helically extended third yarns extending in the same direction produces excellent results and is considered to be preferred for carrying out the invention. In the illustrative embodiment, four such helically extending third yarns extending at an angle of about 45% are employed in the braided structure. The third yarns are braided under relatively high tension, as explained hereinafter, and serve as a means for forcing the warp beads away from the sleeve surface.

In the braiding operation, as will be explained in reference to FIG. 4, the third yarns 15 are loaded on a relatively small number of carriers on the braider so that they contact the warp beads selectively on the inner or the outer surface of each, depending upon whether the warp beads are to be projected inwardly or outwardly from the sleeve surface. In the preferred embodiment where the sleeve is to insulate a tubular element 16, such as an exhaust gas recirculation tube, the helically extending third yarns 15 contact the outer surface of each warp bead 14. The braider is set up so that the helically extending third yarns 15 are under a relatively high tension as compared with the tension of the first and second yarns. On account of the difference in tension, the warp beads are forced radially inwardly from the inner surface of the braid, providing a substantial air gap between the outer surface of the tube 16 and the inner surface of the sleeve 10.

As indicated above, an outer sleeve 18 is preferably provided over the inner surface 10. Outer sleeve 18 may be knitted, woven or braided in conventional manner and is fabricated of a heat insulating, thermally resistant yarn such as E glass. Both the inner and outer sleeves are preferably coated by dip coating or by spray with an acrylic latex binder as is sold under the trademark EXFLEX. As is known to those of ordinary skill in the art, the binder reduces end fray and improves handling properties without interference with flexibility.

Figure 4:
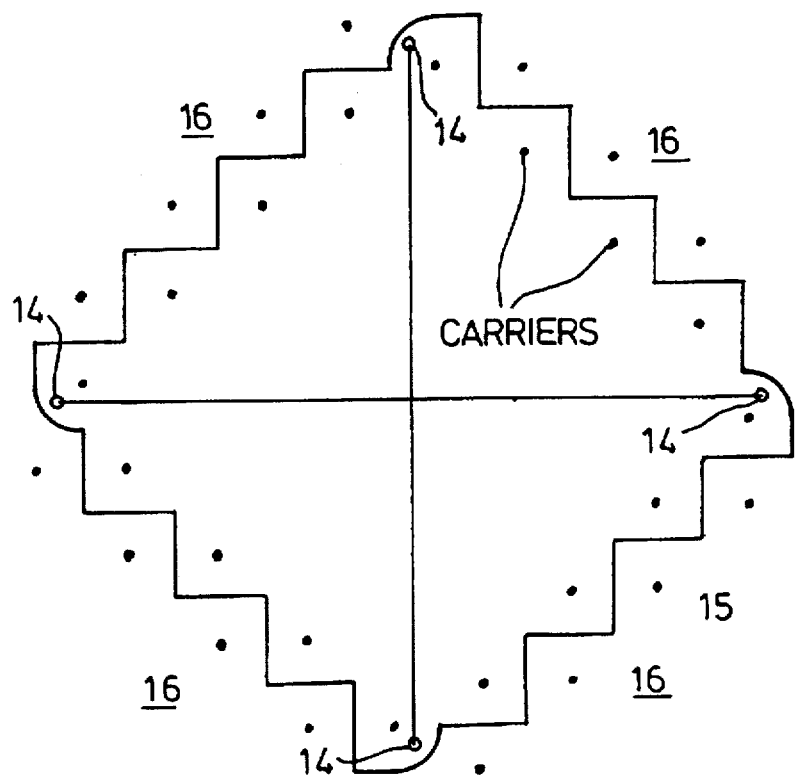
FIGS. 4 and 4a are schematic representations of a braider set up illustrating in the production of the product of FIG. 1.
Figure 4A:
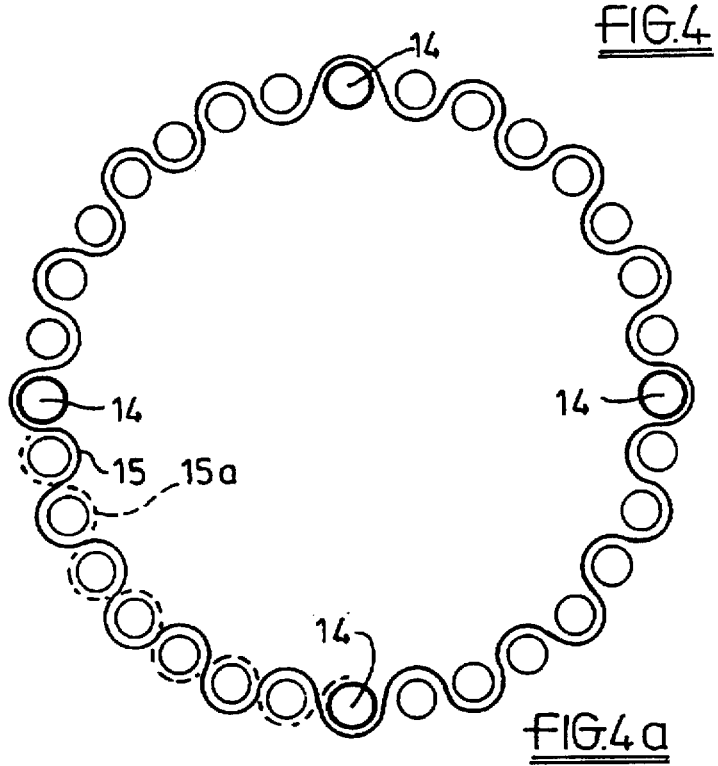

FIGS. 4 and 4a illustrate schematically the set up of a sixty-four carrier braider used in carrying out the invention. Four equidistantly spaced carriers are provided for the helically extending third yarns 15. The warp beads schematically indicated at 14 are delivered to the braider so that they are interlocked within the braid structure of the first and second yarns. It can be seen from FIG. 4 that the helically extending, highly tensioned third yarn 15 passes to the outside of each of the warp beads 14. However, if desired, the helically extending beads could be set up to pass on the inside of the warp beads, thereby forcing the warp beads radially outwardly in order to provide spacers on the outside of the sleeve which would, for example, be of advantage where a component to be protected is located interiorly of an annularly-shaped heat source. The broken line 15a in FIG. 4a illustrates ¼ of the path of the third yarn where it is desired that the third yarn pass to the inside of the warp yarns.

In setting up the braider to braid the inner sleeve, four equidistantly spaced carriers (two on the inside ring and two on the outside) are loaded with the third yarn. The spring tension setting on the braider for the first and second yarns was 3 ounces (85.05 grams), whereas the spring tension setting for the third yarn was 5 ounces (141.75 grams). The first and second yarns are braided so that the surface is substantially void free but should not be so tight as to interfere with the action of the third yarns. It is to be understood that the tensions will vary depending on factors such as product applications, materials and product size but can be readily determined without undue experimentation. As will be understood by those of ordinary skill in the art, to provide that the third yarn passes on the same side of the four warp beads, the total number of carriers must be such that when the number of carriers is divided by eight, the result is an even number. Where the result is an odd number, as would be the case with a seventy-two carrier braider with four carriers loaded with the third yarn, the helical yarns will alternately pass on the inner side and outer side of the warp beads.

We claim:

1. A method of braiding an insulating sleeve on a circular braider comprising:

interbraiding first and second heat resistant yarns;

delivering relatively incompressible warp cords into the braider, said warp cord having a diameter which is greater than the diameter of said first and second yarns, and feeding the warp cords between the first and second yarns as the first and second yarns are interbraided;

interbraiding at least one third yarn with the first and second yarns, setting up the braider for the third yarn to pass the third yarn on the same side of all of the warp cords; and maintaining a tension on the third yarn sufficient to offset the warp cords from the centerline of the sleeve wall.

2. A method according to claim 1, wherein the warp cords are equidistantly spaced around the sleeve circumference.

3. A method according to claim 2 which comprises four such warp cords.

4. A method according to claim 3 which comprises passing the tensioned third yarn to the outside of said warp cords.

* * * * *